Patented Nov. 23, 1943

2,335,124

UNITED STATES PATENT OFFICE 2,335,124

SYNTHETIC RUBBERLIKE MATERIAL

Erich Konrad and Richard Ludwig, Leverkusen-I. G.-Werk, Germany; vested in the Alien Property Custodian No Drawing. Application May 11, 1940, Serial No. 334,574

5 Claims. (Cl. 260—23)

The present invention relates to emulsions of new synthetic rubber-like materials and to a process of preparing the same.

Butadiene hydrocarbons are capable of being polymerized in various ways. In case rubber-like materials are intended there is preferably employed the so-called emulsion polymerization process. The best results have been obtained by subjecting to the emulsion polymerization a mixture of a butadiene hydrocarbon and a compound containing an activated vinyl group. One of the best products out of this type is that which has been prepared by the conjoint emulsion polymerization of butadiene-1.3 and styrene. Such products are described and claimed in the U. S. Patents No. 1,938,730 and 1,938,731 to Eduard Tschunkur and Walter Bock, filed July 10, 1930. The products disclosed therein are characterized by their having a styrene content of below about 45% by weight. Obviously, the patentees were of the opinion that mixed polymerizates of the character described in order to exhibit rubber-like properties must have a butadiene content of above about 65%. In accordance therewith, the resulting products if vulcanized in the presence of finely divided carbon black exhibit excellent mechanical properties and represent the best synthetic rubber-like material which up to the present has been prepared in a technical scale. On the other hand, it cannot be disputed that these products suffer from certain disadvantages in the vulcanized state chief among which are the insufficient plasticity and the insufficient solubility in organic solvents. In consequence of the bad plasticity, the working of such products on the mill, the incorporation therewith of filling materials and of vulcanization ingredients and the calendering of the same is connected with considerable difficulties. In order to overcome such inconveniences one has proposed to subject such products to a breaking-down process which is performed by exposing the same to the action of oxygen at a higher temperature in the presence of so-called anticyclicizing agents such as phenyl-β-naphthylamine.

It has now been found that the hitherto unknown products of the conjoint emulsion polymerization of butadiene and styrene, the styrene content of which is between about 45% and about 70%, are distinguished by certain new and unexpected properties. The present invention is based upon the observation that an increase of the styrene content (within distinct limits) brings about an increase of plasticity and, in accordance therewith, of the workability of such products and, moreover, of solubility. In accordance therewith, the said new products are capable of being dissolved in organic solvents such as benzene without the necessity of subjecting the same to a breaking-down process. Hence it follows, that they can be directly employed for impregnating or coating purposes and the like. Similar remarks apply to the masticating and to the incorporation therewith of filling materials and of the vulcanization ingredients. On the other hand, the mechanical properties of the vulcanizates which are obtainable therefrom are not materially changed when compared with those of the prior known butadiene-styrene-mixed polymerizates. On the contrary, an increase of the styrene content within the limits specified above results in an increase of the tensile strength and elongation. This is true regardless as to whether the vulcanizates have been prepared in the presence of carbon black or not. For giving an example, vulcanizates of butadiene and styrene emulsion polymerizates in the proportion of 3:1 if vulcanized in the absence of carbon black show a tensile strength of about 60 kg. per cm.$^2$, whereas a product which has been prepared under the same conditions in a proportion of 1:1 has a tensile strength of about 90 kg. per cm.$^2$.

Such effects are completely unexpected. In support of this argument we refer to the experiences which have been made in connection with other polymerization processes. We are aware of the fact that in many prior publications there is disclosed a polymerization of butadiene hydrocarbons and styrene according to the heat polymerization process, the starting materials being partly employed within the proportion which is made use of in the present invention. Thus, the British Patent No. 345,939 and the French Patent 803,707 disclose the heat polymerization of butadiene hydrocarbons and styrene in the proportion of 2:3 and of 1:1. In the heat polymerization process there is to be observed a gradual decrease of the plasticity with an increase of the styrene content so that the pure polymeric butadiene is the softest product whereas the pure polymeric styrene represents a hard resin which has nothing to do with rubber. Contrary thereto, in the case of the emulsion polymerization of butadiene-1.3 and styrene the plasticity of the resulting unvulcanized products reaches a maximum within the styrene proportion specified above, the pure polymeric butadiene and mixed polymerizates of a lower styrene content as well as the pure polymeric styrene being harder than the products of the styrene content between about 45% and about 70%. If follows therefrom that the experiences which have been made in connection with the heat polymerization process in the proportions as claimed herein lead one away from the present invention. Similar remarks apply to the experiences which have been made in connection with other prior known polymerization processes. Attention is directed in this connection to the French Patent 848,411 according to which the products of the polymerization of butadiene and styrene in the proportion of 1:1 if prepared under the influence of boron fluoride represent a resin-like material.

The preparation of our new polymerizates can be effected in any desired manner. In case there is worked in an alkaline medium we prefer to employ as emulsifying agents alkylated naphthalene sulfonic acids, if desired, in the additional presence of higher fatty acids such as linoleic acid. In the case of working in an acid medium dodecylamine hydrochloride or esters of anino alcohols with higher fatty acids have proved to be particularly suitable. Furthermore, oxygen yielding polymerization catalysts such as peroxydes can be incorporated within the emulsion. The polymeric products can be isolated by coagulation, for instance by salting out. Prior to coagulation there are preferably incorporated anticyclizing agents within the emulsion. As my new polymerizates are distinguished by a good plasticity, the use of regulating agents during polymerization as well as the subsequent breaking-down process can be dispensed with, though the application of such methods is by no means excluded from the present invention.

It is to be understood that in most cases the proportion of the butadiene and styrene in the mixed polymerizate does not correspond to the proportion in which the starting materials have been employed for the polymerization. In general and particularly in the case of working in an alkaline medium the styrene proportion of the final product is somewhat lower than that of the mixture of the polymerizable starting materials.

As to the emulsifiers we prefer to work in the presence of alkali alkylnaphthalene sulfonates; salts of higher fatty acids such as of linoleic acid can be added thereto in order to effect an increase of softness of the polymerizates.

Other objects of our invention will be apparent from the following examples, the parts being by weight.

*Examples*

1. 50 parts of styrene and 50 parts of butadiene-1.3 are emulsified in 130 parts of an aqueous solution of 3.5 parts of sodium diisobutylnaphthalene sulfonate and 2 parts of sodium linoleate with the addition of 0.05 part of sodium hydroxide and 0.28 part of potassium persulfate. The polymerization is affected at 48° C. After the course of about 40 hours 3 parts of phenyl-β-naphthylamine are incorporated therewith in form of an aqueous dispersion. Thereupon the emulsion is coagulated by the addition of sodium chloride and acetic acid.

The resulting synthetic rubber-like material which is obtained in a yield of about 70 per cent of the monomeric starting materials (i. e. butadiene+styrene) and contains (in form of a mixed polymerizate) about 47.5 parts of styrene and about 52.5 parts of butadiene, shows a relatively good plasticity and is capable of being masticated. Contrary thereto, a mixed polymerizate which has been prepared under the same conditions from a mixture of 75 parts of butadiene-1.3 and 25 parts of styrene in order to reach the same degree of plasticity requires a prolonged beating under oxidizing conditions as it is more fully described in the French Patent No. 835,448. I wish to point out in this connection that such comparative plasticity measurements have been performed in the manner described by H. Hagen in "Kautschuk," vol. 15 pages 88 to 95, this publication being referred to in "Chemical Abstracts" vol. 33, No. 16, page 6647, and in particular with the "Continental Deformation Apparatus."

In the following we are giving some comparative figures regarding the mechanical properties of vulcanizates prepared from such mixed polymerizates of varying styrene contents. Table I shows the figures obtained with a product which has been prepared as described in paragraph 1 of this example whereas table II is concerned with the prior known product having been prepared from 75 parts of butadiene and 25 parts of styrene. The vulcanization has been effected in each case by a 60 minutes heating at an overpressure of 2 atmospheres of the following mixture:

| | Parts |
|---|---|
| Synthetic rubber | 100 |
| Active zinc oxide | 12 |
| Zinc oxide | 12 |
| Carbon black | 7.5 |
| Tar-distillation residues (see "India Rubber Journal," vol. LXXIV, page 10 (66) left hand column) such as the product known under the registered trade-mark "Caoutchol" | 2 |
| Tetrahydronaphthalene | 3 |
| Sulfur | 1.5 |
| Mercaptobenzothiazyl - sulfen - diethyl - amide | 1.5 |

| | a | b | c | d | e | f |
|---|---|---|---|---|---|---|
| Table I | 140 | 735 | 22 | 55 | 43 | 68 |
| Table II | 70 | 850 | 16 | 50 | 65 | 60 |

In these tables $a$ indicates the tensile strength in kg./cm.$^2$, $b$ the elongation in per cent, $c$ the load at 300% elongation, $d$ the hardness in degree shore, $e$ the elasticity in per cent at 20° C. and $f$ the elasticity in per cent at 70° C.

As it follows from the above tables, our new product shows a considerably improved tensile strength in a mixture which is poor in carbon black (such mixtures being employed in the preparation of carcasses) when compared with the prior known product, the elasticity of our new product being increased with an increase of temperature whereas no increase or even a decrease is to be observed in the case of the prior known product. Moreover, our new product shows a considerably improved plasticity in the unvulcanized state and, in consequence thereof, an improved capability of being masticated and of being drawn into plates, an improved tubing capacity and, moreover, a better adhesive power.

2. 50 parts of styrene and 50 parts of butadiene are polymerized at 40° C. in 180 parts of an aqueous solution of 3 parts of the hydrochloride of an ester prepared from a higher fatty acid and N-diethylaminoethanol in the presence of 0.2 part of ammonium persulfate and 2 parts of linoleic acid. After the course of about 20 hours 3% of phenyl-β-naphthylamine are incorporated within the emulsion and the solids are precipitated by means of sodium bisulfite. The product which is obtained in a yield of about 70% and contains about equal amounts of the butadiene and the styrene shows a good workability and tubing capacity and also a good elasticity in the vulcanized state.

3. 60 parts of styrene and 40 parts of butadiene are polymerized at 35° C. in 142 parts of an aqueous solution of 4 parts of sodium diisobutyl-naphthalene sulfonate in the presence of 0.24 part of sodium hydroxide, 0.35 part of potassium persulfate and 0.05 part of diisopropylxanthogendisulfide. After about 70 hours there are added thereto 3 parts of phenyl-β-naphthylamine whereupon the solids are isolated in the usual manner, the yield being about 70%. The final product contains about 55% of styrene in form of the mixed polymerizate.

In a similar manner there can be prepared products of higher styrene contents of up to about 70 per cent. In all such cases the plasticity of our new products is superior to that of the prior known products. This is illustrated by the fact that a mixed polymerizate from butadiene and styrene in the proportion 3:7 requires a 3 to 5 times passing between a pair of rollers for reaching the same plasticity as it is affected by a 60 minutes' heating to 135° C. under oxidizing conditions of a mixed polymerizate of btuadiene and styrene in the proportion of 7.5:2.5. Moreover, our new products are capable of being tubed without the presence of softeners thus yielding coherent and smooth articles whereas the prior known products are insuitable for being worked in the tubing machine.

We claim:

1. The aqueous emulsions of products of the conjoint polymerization of butadiene-1.3 and styrene in aqueous emulsion, the styrene content of the polymeric product being between about 47.5% and about 70%, said polymeric product being soluble in benzene without being subjected to a breaking-down process.

2. An acid aqueous emulsion of products of the conjoint polymerization of butadiene-1.3 and styrene in aqueous emulsion, the styrene content of the polymeric product being between about 47.5% and about 70%, said polymeric product being soluble in benzene without being subjected to a breaking-down process.

3. An alkaline aqueous emulsion of products of the conjoint polymerization of butadiene-1.3 and styrene in aqueous emulsion, the styrene content of the polymeric product being between about 47.5% and about 70%, the aqueous medium having dissolved therein alkali alkylnaphthalene sulfonates, said polymeric product being soluble in benzene without being subjected to a breaking-down process.

4. An alkaline aqueous emulsion of products of the conjoint polymerization of butadiene-1.3 and styrene in aqueous emulsion, the styrene content of the polymeric product being between about 47.5% and about 70%, the aqueous medium having dissolved therein alkali alkylnaphthalene sulfonates and salts of higher fatty acids, said polymeric product being soluble in benzene without being subjected to a breaking-down process.

5. An aqueous emulsion of the polymeric product of the conjoint polymerization of butadiene-1.3 and styrene in aqueous emulsion, wherein the ratio of the butadiene content to the styrene content of the polymeric product is 1:1, said polymeric product being soluble in benzene without being subjected to a breaking-down process.

ERICH KONRAD.
RICHARD LUDWIG.